United States Patent
Su et al.

(10) Patent No.: US 8,166,226 B2
(45) Date of Patent: Apr. 24, 2012

(54) APPARATUS AND RELATED METHOD FOR MAINTAINING READ CACHING DATA OF SOUTH BRIDGE WITH NORTH BRIDGE

(75) Inventors: Yao-Chun Su, Taipei Hsien (TW); Jui-Ming Wei, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 1374 days.

(21) Appl. No.: 11/160,694

(22) Filed: Jul. 6, 2005

(65) Prior Publication Data

US 2006/0041706 A1    Feb. 23, 2006

(30) Foreign Application Priority Data

Aug. 17, 2004  (TW) ............................. 93124734 A

(51) Int. Cl.
G06F 13/36  (2006.01)
G06F 13/20  (2006.01)

(52) U.S. Cl. ........ 710/310; 710/308; 710/311; 710/312; 710/313

(58) Field of Classification Search .................. 710/306
See application file for complete search history.

(56) References Cited

U.S. PATENT DOCUMENTS

| | | | |
|---|---|---|---|
| 6,275,885 B1* | 8/2001 | Chin et al. ................. | 710/311 |
| 6,338,119 B1* | 1/2002 | Anderson et al. ........... | 711/135 |
| 6,463,510 B1* | 10/2002 | Jones et al. ............... | 711/138 |
| 6,470,429 B1* | 10/2002 | Jones et al. ............... | 711/138 |
| 6,598,128 B1* | 7/2003 | Yoshioka et al. ........... | 711/144 |
| 6,725,342 B1* | 4/2004 | Coulson ..................... | 711/141 |
| 6,795,876 B1* | 9/2004 | Solomon ..................... | 710/34 |
| 6,804,741 B2* | 10/2004 | Cowan ........................ | 710/311 |
| 6,820,161 B1* | 11/2004 | Perez ......................... | 710/306 |
| 6,823,409 B2* | 11/2004 | Jones et al. ............... | 710/107 |
| 6,829,665 B2* | 12/2004 | Jones et al. ............... | 710/107 |
| 6,862,646 B2* | 3/2005 | Bonola et al. .............. | 710/306 |
| 6,941,423 B2* | 9/2005 | Coulson ..................... | 711/141 |
| 6,978,351 B2* | 12/2005 | Osborne et al. ............ | 711/137 |
| 7,017,054 B2* | 3/2006 | Schuckle et al. ........... | 713/300 |
| 7,051,162 B2* | 5/2006 | Vo ............................... | 711/137 |
| 7,055,005 B2* | 5/2006 | Walker et al. .............. | 711/137 |
| 2002/0087803 A1* | 7/2002 | Jones et al. ............... | 711/138 |
| 2003/0135685 A1* | 7/2003 | Cowan ........................ | 710/308 |
| 2004/0006716 A1* | 1/2004 | Schuckle et al. ........... | 713/300 |
| 2004/0128449 A1* | 7/2004 | Osborne et al. ............ | 711/137 |
| 2004/0162950 A1* | 8/2004 | Coulson ..................... | 711/141 |
| 2004/0199726 A1* | 10/2004 | Vo ............................... | 711/137 |
| 2004/0199728 A1* | 10/2004 | Walker et al. .............. | 711/138 |

* cited by examiner

Primary Examiner — Ryan Stiglic
(74) Attorney, Agent, or Firm — Winston Hsu; Scott Margo

(57) ABSTRACT

A computer system has a central processing unit, a north bridge electrically connected to the central processing unit, memory electrically connected to the north bridge, a south bridge electrically connected to the north bridge, and a peripheral device electrically connected to the south bridge. The south bridge includes a register for storings a plurality of pre-fetched read data to provide the pre-fetched read data to the peripheral device. The north bridge has an address queue module for storing an address of the pre-fetched read data, and a snooping module for checking whether a data value corresponding to the address is updated by the CPU. The north bridge assists the south bridge in obtaining and maintaining the pre-fetched read data for high efficiency and accuracy of read caching of the south bridge.

15 Claims, 3 Drawing Sheets

APPARATUS AND RELATED METHOD FOR MAINTAINING READ CACHING DATA OF SOUTH BRIDGE WITH NORTH BRIDGE

BACKGROUND OF THE INVENTION

1. Field of the Invention

The present invention relates to an apparatus and related method for high efficiency and accuracy read caching of a south bridge, and more particularly, to an apparatus and related method for high efficiency and accuracy read caching of south bridge using north bridge address queuing.

2. Description of the Prior Art

A computer system is one of the most fundamental hardware devices in modern society. The way of making highly efficient and accurate computer systems is of key importance.

A typical computer system comprises a central processing unit, a chip set that includes a south bridge and a north bridge, system memory, and peripheral devices. The central processing unit controls the operation of data processing and computation; the system memory stores data needed by the central processing unit during the operation. The north bridge is electrically connected to the central processing unit and the system memory. The south bridge is electrically connected to the peripheral devices via a bus, such as a PCI bus; the chip set coordinates the data exchange between the central processing unit, the system memory and the peripheral devices. For example, when a peripheral device, such as a hard drive or a CD-ROM, reads data of specified addresses from the system memory, the peripheral device sends a request to the south bridge for data reading, and then the south bridge coordinates the north bridge to read the data of the specified addresses from the system memory and transmits the data to the peripheral device via the south bridge, so thus, the request of the peripheral device is fulfilled.

In order to improve the efficiency of the peripheral devices, the south bridge can perform read caching. When a peripheral device is reading data of specified addresses from the system memory, the south bridge not only informs the north bridge for reading data of the specified addresses, but also requests that the north bridge read extra data at the adjoining addresses as pre-fetched read data. After the north bridge completes data reading, the south bridge transmits the data of the specified addresses to the peripheral device to fulfill its request, and the pre-fetched read data then is stored in the south bridge. Next time, as the peripheral device requests data of other addresses from the system memory, the south bridge checks if the addresses of the pre-fetched read data match the addresses of the requested data, and if so, the south bridge transmits the pre-fetched read data to the peripheral device without going through the north bridge for reading data in the system memory. Therefore, the south bridge can fulfill the peripheral device's request faster.

For example, when the peripheral device is performing a burst read of the system memory, the peripheral device asks for data of four sequential addresses AD(n), AD(n+1), AD(n+2) and AD(n+3). When performing read caching, the south bridge requests that the north bridge read eight data of sequential addresses AD(n) to AD(n+7) from the system memory, wherein, the data of addresses AD(n) to AD(n+3) is requested by the peripheral device, and the south bridge transmits these four data to the peripheral device. Then the rest of the four data are stored in the south bridge as the pre-fetched read data. Next time, when the peripheral device asks for data, if the data of addresses AD(n+4) to AD(n+7) is what the peripheral device needs, the south bridge transmits these pre-fetched read data to the peripheral device directly. Because one of the peripheral device's characteristics is regularly reading data of adjoining addresses from the system memory, read caching of the south bridge can improve the efficiency of the peripheral device.

On the other hand, as known by those skilled in the art, the central processing unit of the computer system also has an internal cache (cache memory). The central processing unit reads the data from the system memory via the north bridge and stores it into the cache, and then uses the cache to store and read the data during operation. When the central processing unit is executing a program, it may use one of the system memory's data spaces, for example address AD(m), for temporarily storing a parameter; the central processing unit reads the data of address AD(m) from the system memory via the north bridge, and stores it into the cache. Then, following the procedure of the program, supposing that the data of the address AD(m) should be updated, the central processing unit can directly update the data in the cache without writing back to the system memory. Of course, the central processing unit will write back the data to the system memory at some specific time, but the potential of the cache would be wasted if the central processing unit wrote back to the system memory frequently.

Both the read caching of the south bridge and the cache of the central processing unit are designed for improving the efficiency of the computer system, however, data incoherence may result if these two mechanisms work at the same time. For example, when the data of address AD(m) is stored in the south bridge as a pre-fetched read data and also read into the cache of the central processing unit, at this moment, if the central processing unit updates the data of address AD(m), the south bridge cannot detect that the data has being updated, and thus the data in the south bridge is out of date. Under such circumstance, if the south bridge transmits the data of address AD(m) to the peripheral device, it will cause data incoherence and make the computer system malfunction. This is because, with the data content of same address AD(m), the central processing unit already updates the data, but the peripheral device receives the non-updated data from the south bridge.

To avoid the above data incoherence, the prior art sets a counter in the south bridge for counting the lifetime of data. If the data storing time of the pre-fetched read data is over the default time or lifetime, the south bridge will be forced to invalidate the data. The assumption of this prior art is that as operation time of the computer system increases there is a higher possibility of each data in the system memory being read into the cache of the central processing unit; if data storing time of one certain address of data in the south bridge is over the default lifetime, the possibility of that certain address of data being read into the central processing unit is supposed to be over a critical value, which means it is possible that the certain address of data has been read into the cache of the central processing unit. In order to prevent data incoherence, the south bridge should not keep the original data contents of this certain address of data, but invalidate it.

In other words, in the above prior art, the south bridge cannot detect whether the pre-fetched read data is updated in the cache of the central processing unit, and thus cannot actually prevent data incoherence. Moreover, if the lifetime is set too short, the south bridge must invalidate the pre-fetched read data frequently; under this circumstance, the south bridge may invalidate pre-fetched read data, which has not been read into the cache of the central processing unit, without using these pre-fetched read data efficiently. In addition, each invalidation will affect the efficiency of the operation of the south and north bridges. On the other hand, if the lifetime is too long, data incoherence is more common.

SUMMARY OF THE INVENTION

It is therefore an objective of the claimed invention to provide an apparatus and related method for high efficiency and accuracy read caching of a south bridge using north bridge address queuing, in order to solve the problems of the prior art.

In the computer system, the north bridge is capable of snooping the central processing unit, and is also responsible for managing writing back of the cache of the central processing unit. Thus the north bridge can inspect data of which an address is read into the cache of the central processing unit and determine whether it is updated.

In the claimed invention, the north bridge has an address queue module. When the north bridge reads data from the system memory or the cache of the central processing unit and transmits it to the south bridge as pre-fetched read data, the address queue module stores addresses of these pre-fetched read data. The north bridge also has a snooping module for snooping the central processing unit periodically. According to the addresses in the address queue module, the snooping module checks whether the data of these addresses are read and/or updated in the cache of the central processing unit. If the data of some of these addresses are updated by the central processing unit, the north bridge uses an in-band signal between the north and south bridges to inform the south bridge to invalidate the data and re-request updated data for maintaining data coherence. If the north bridge does not find any update of the data in the cache of the central processing unit, the south bridge can keep the original pre-fetched read data.

In addition, when the central processing unit writes back the data from the cache to the system memory via the north bridge, the snooping module of the north bridge can check whether the data of each address in the address queue module is updated in the cache of the central processing unit, and further ensure the coherence between the pre-fetched read data and the data in the cache of the central processing unit.

In other words, the claimed invention uses the north bridge for snooping the central processing unit to maintain the coherence between pre-fetched read data in the south bridge and data in the cache of the central processing unit. Besides that, the claimed invention can improve the efficiency of read caching of the south bridge because the south bridge invalidates the pre-fetched read data only if the data is updated in the cache. This can reduce the number of times of invalidation and lessen its effect on efficiency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
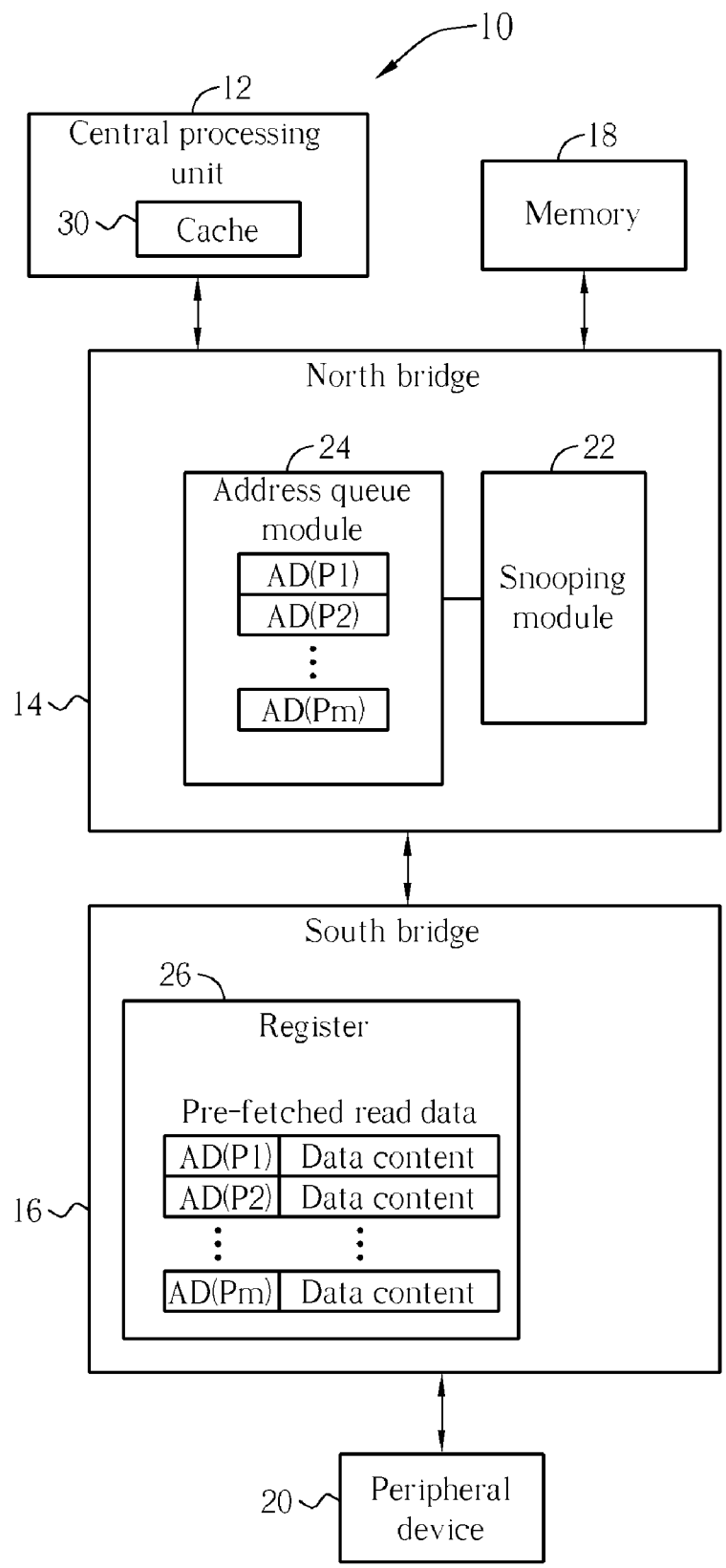
FIG. 1 is a functional block diagram of a computer system according to the present invention.

Please refer to FIG. 1, which shows a functional block diagram of a computer system 10 according to the present invention. The computer system 10 comprises a central processing unit 12, a chip set that includes a north bridge 14 and a south bridge 16, a memory 18 (such as DRAM) as system memory electrically connected to the north bridge 14, a peripheral device 20 electrically connected to the south bridge 16 via a bus which can be a peripheral communications interface bus. The computer system 10 has one or a plurality of peripheral devices. The peripheral device 20 in FIG. 1 represents any kind of peripheral device, such as a hard drive, a CD-ROM drive, or an add-on card such as a sound card or a network card. The central processing unit 12 controls the computer system 10 to execute software programs for data processing and computation. There is also a cache 30 in the central processing unit for caching data. The south bridge has a register 26 for read caching data. To implement the present invention, the north bridge 14 has a snooping module 22 and an address queue module 24.

When the peripheral device 20 is reading data of addresses AD(n) to AD(n+k) from the memory 18, the south bridge 16 sends an upstream request to the north bridge for reading data of addresses AD(n) to AD(n+k) and extra data of addresses AD(P1), AD(P2) to AD(Pm). The data of addresses AD(n) to AD(n+k) requested by the peripheral device 20 are called peripheral data; The data of addresses AD(P1), AD(P2) to AD(Pm) are pre-fetched read data of the south bridge 16. Addresses AD(P1), AD(P2) to AD(Pm) adjoin addresses AD(n) to AD(n+k), and addresses AD(P1), AD(P2) to AD(Pm) are sequential addresses as well.

When the north bridge 14 receives a request from the south bridge 16, the snooping module 22 of the north bridge snoops the cache 30 to check if any of the data of the addresses requested by the south bridge are read and/or updated in the cache 30. If data has not been updated in the cache 30, the north bridge 14 reads the data from the memory 18 and transmits them to the south bridge 16. If some of the data have been updated in the cache 30, the north bridge 14 obtains the updated data and then transmits them to the south bridge 16. In any case, the north bridge will ensure the coherence between data requested by the south bridge 16 and data in the cache 30 (if some of the data have been read into the cache 30) before the data is transmitted to the south bridge 16.

In the present invention, the north bridge 14 not only ensures data coherence before it transmits the data to the south bridge 16, but also stores the addresses of pre-fetched read data, AD(P1), AD(P2) to AD(Pm), in the address queue module 24 at the same time. The south bridge 16 directly transmits the peripheral data of addresses AD(n) to AD(n+k) to the peripheral device 20 once it receives the data from the north bridge 14. The pre-fetched read data of addresses AD(P1), AD(P2) to AD(Pm) are cached in the south bridge 16. The south bridge 16 continues keeping these data, because the peripheral device 20 may request these data later.

Of course, as mentioned above, during the period of the south bridge 16 keeping the pre-fetched read data of addresses AD(P1), AD(P2) to AD(Pm), the central processing unit 12 may read data of some of these addresses into the cache 30 from the system memory 18 and update them in the cache 30. This may cause incoherence between the pre-fetched read data and data in the cache 30. To avoid such data incoherence, during the period when the south bridge 16 keep these read data cached, the north bridge 14 periodically snoops the cache 30 using the snooping module 22. With the address queue module 24 already recording addresses of the pre-fetched read data AD(P1), AD(P2) to AD(Pm), these addresses can be further compared with the checking result of the snooping module 22 to see whether any of the data of these addresses is read and/or updated in the cache 30. If none of them are updated in the cache 30, the south bridge 16 continues keeping the pre-fetched read data. Next time, when the peripheral device 20 requests data of certain addresses, and these addresses are the same as addresses of the pre-fetched read data, the south bridge 16 can directly transmit the pre-fetched read data to the peripheral device 20 to fulfill its request quickly.

On the other hand, while snooping the cache 30, if the snooping module 22 finds any update of the data of addresses AD(P1), AD(P2) to AD(Pm), this means the pre-fetched read data in the south bridge 16 is out of date (lack of the latest version). The north bridge 14 then uses a downstream command of the in-band to signal the south bridge 16. The south bridge 16 invalidates the pre-fetched read data and sends an upstream request to the north bridge 14 for transmitting the updated data in the cache 30 to the south bridge 16. Therefore, coherence between pre-fetched read data in the south bridge 16 and data in the cache 30 can be maintained.

Besides snooping periodically, when the central processing unit 12 writes back data in the cache 30 to the memory 18, the snooping module 22 of the north bridge 14 automatically checks if addresses of the written-back data comprise any address of the pre-fetched read data and if the pre-fetched read data are updated. If not, the south bridge 16 keeps the original pre-fetched read data; if so, the north bridge 14 signals the south bridge 16 for invalidating the original pre-fetched read data, and then the north bridge 14 transmits the updated data to the south bridge 16, such that data coherence can be maintained. This also improves efficiency of read caching of the south bridge 16 by reducing unnecessary invalidation.

Figure 2:
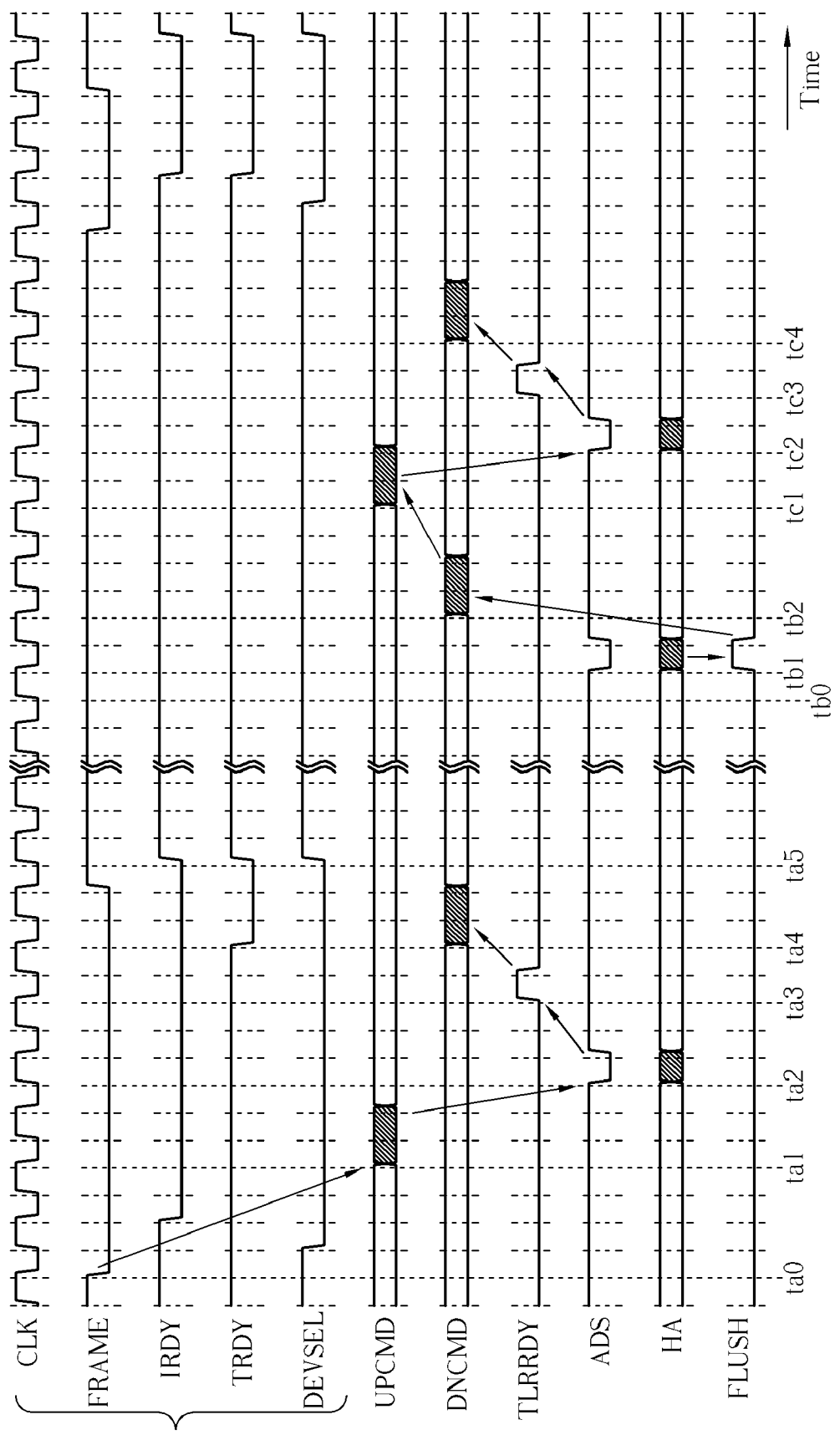
FIG. 2 is a time sequence diagram describes waveforms of related signals during the operation of the computer system of FIG. 1.

To further illustrate the present invention, please refer to FIG. 2 (and refer to FIG. 1 as well). When the computer system 10 uses the north bridge 14 to assist the south bridge 16 in obtaining and maintaining pre-fetched read data, the communications between the south and north bridges 14, 16 can be shown as in FIG. 2, which is a time sequence diagram describing waveforms of related signals. The horizontal axis of FIG. 2 represents time. Among these signals in FIG. 2, a signal CLK is the clock of the south and north bridges 16, 14, and signals FRAME, IRDY, TRDY and DESVEL are basic bus signals between the south bridge 16 and the peripheral device 20.

Suppose at time ta0, the peripheral device 20 is required to read data from the memory 18, the peripheral device 20 changes signal FRAME from digital 1 to digital 0 for sending a request to the south bridge 16. At time ta1, the south bridge 16 sends an upstream request in signal UPCMD to the north bridge 14 for requesting the north bridge 14 to obtain the requested data including peripheral data and pre-fetched read data. At time ta2, signal ADS becomes digital 0, which represents the beginning of snooping the cache 30 of the central processing unit 12. At time ta3, signal TLRRDY becoming digital 1 meaning that the north bridge 14 receives a response from the central processing unit 12. Then at a time ta4, the north bridge 14 sends a downstream command in signal DNCMD to the south bridge 16 for getting the south bridge 16 the requested data, and the north bridge 14 stores addresses of the pre-fetched read data in the address queue module 24 as well. In the period between ta4 and ta5, the south bridge 16 transmits the peripheral data to the peripheral device 20, and also starts keeping the pre-fetched read data.

At time tb1, the central processing unit 12 makes signal ADS digital 0 for updating data in the memory 18. The north bridge 14 then starts to ensure coherence between pre-fetched read data in the south bridge 16 and data in the cache 30. The north bridge 14 snoops the central processing unit 12 to check whether the data of the addresses in the address queue module 24 are updated in the cache 30. Suppose the north bridge 14 starts snooping at time tb1, and finds some data of the addresses are updated in the cache 30. Under such circumstance, as shown in FIG. 2, the north bridge 14 makes signal FLUSH digital 1 at time tb1 to indicate that the pre-fetched read data should be invalidated. At time tb2, the north bridge 14 sends a downstream command in signal DNCMD to notify the south bridge 16 that the data are incoherent. Then the south bridge 16 starts to invalidate the pre-fetched read data by performing the following: at time tc1, the south bridge 16 sends an upstream request in signal UPCMD to the north bridge 14 for providing the updated pre-fetched read data; at time tc2, the north bridge 14 asks the central processing unit 12 for the data in the cache 30; at time tc3, the north bridge 14 obtains the data; at time tc4, the north bridge 14 transmits the updated pre-fetched read data to the south bridge 16. Therefore, coherence between pre-fetched read data in the south bridge 16 and data in the cache 30 can be maintained.

Figure 3:
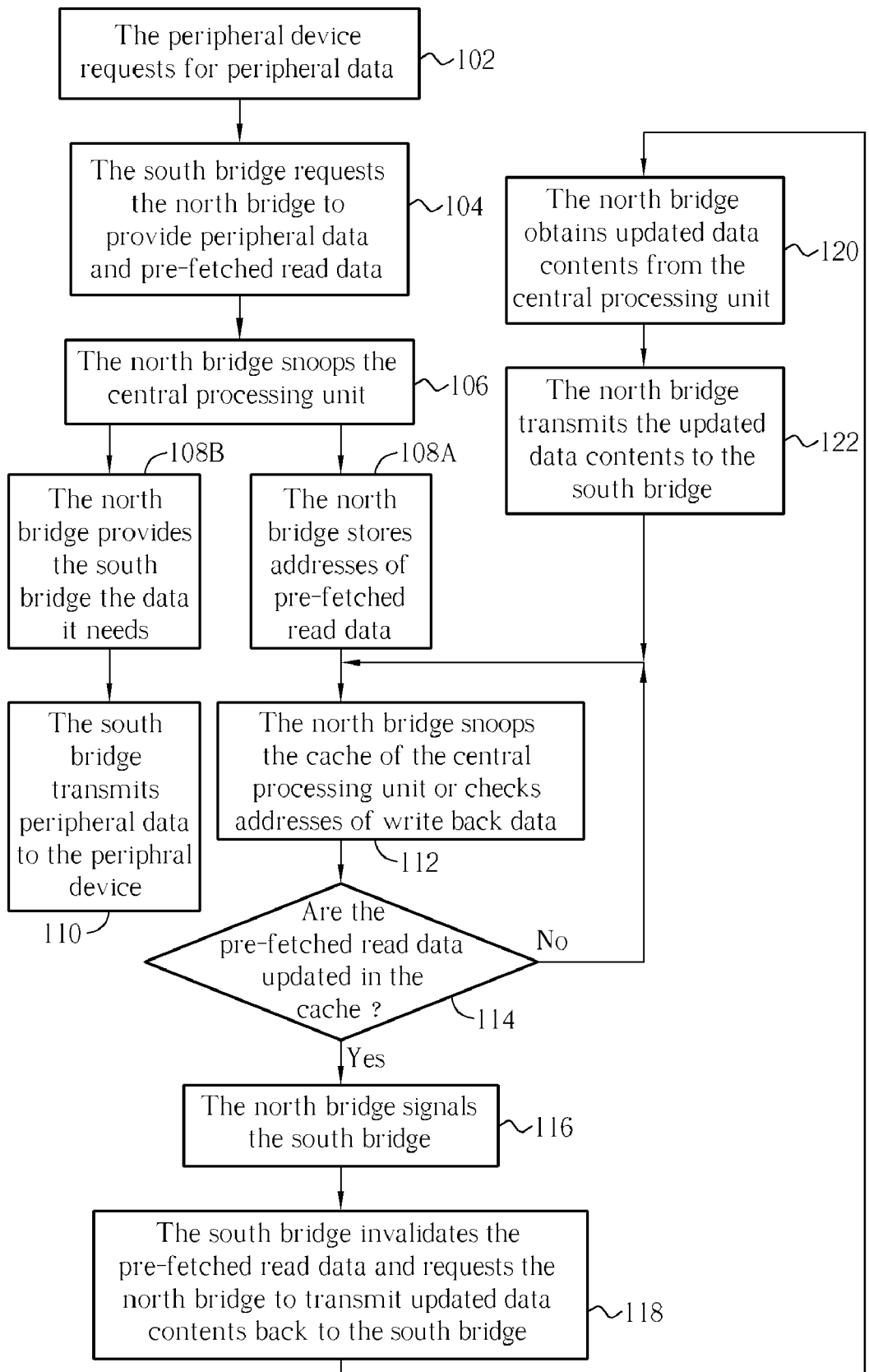
FIG. 3 is a flowchart of the operation of the computer system of FIG. 1.

Summarizing the above, the procedures of the present invention can be described in FIG. 3. Please refer to FIG. 3 (and refer to FIG. 1 as well), the flowchart of FIG. 3 includes the following steps:

Step 102: The peripheral device 20 requests for data from the memory 18. Thus the peripheral device 20 sends a reading request to the south bridge 16.

Step 104: The south bridge 16 sends an upstream request to the north bridge 14 for requesting peripheral data and pre-fetched read data.

Step 106: Besides reading requested data from the memory 18, the north bridge 14 in advance snoops the central processing unit 12 in order to provide the latest data to the south bridge.

Step 108A: The north bridge 14 stores addresses of pre-fetched read data in the address queue module 24.

Step 108B: The north bridge 14 provides the south bridge 16 the data it needs.

Step 110: The south bridge 16 transmits peripheral data to the peripheral device 20 and starts keeping pre-fetched read data at the same time.

Step 112: For assisting the south bridge 16 in maintaining the pre-fetched read data, the north bridge 14 snoops the cache 30 of the central processing unit 12, or according to the addresses in the address queue module 24, the north bridge 14 checks whether the data of these addresses are updated in the cache 30 while the central processing unit 12 writes back the data in the cache 30 to the memory 18 for updating data.

Step 114: If some data of the addresses in the address queue module 24 are updated in the cache 30, the method proceeds to step 116; otherwise, the method returns to step 112.

Step 116: The north bridge 14 sends a downstream command to the south bridge 16 for invalidating the pre-fetched read data.

Step 118: When invalidating the pre-fetched read data, the south bridge 16 sends an upstream request to the north bridge 14 for obtaining updated pre-fetched read data.

Step 120: The north bridge 14 snoops the central processing unit 12 and obtains updated pre-fetched read data from the cache 30.

Step 122: By using the north bridge 14, the south bridge 16 obtains updated pre-fetched read data and maintains coherence between pre-fetched read data and data in the cache 30.

In contract to the prior art, the present invention stores addresses of the pre-fetched read data in the north bridge 14, and uses the north bridge 14 to snoop the central processing unit 12 for checking whether the pre-fetched read data are updated in the cache 30 of the central processing unit 12. Thus the pre-fetched read data in the south bridge 16 can be maintained. The present invention not only maintains coherence between pre-fetched read data and data in the cache 30, but also improves efficiency of read caching. In FIG. 1, every module in the north and south bridges 14, 16 can be implemented by using hardware or firmware. For example, the register 26 can be realized by using a first-in-first-out (FIFO) register, while the snooping module 22 can be implemented with a programmable controller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A chip set electrically connected to a central processing unit (CPU) and a peripheral device, comprising:
    a south bridge electrically connected to the peripheral device, the south bridge having a register for storing a plurality of pre-fetched data to provide the pre-fetched data to the peripheral device while being requested, wherein an adjoining data of a peripheral data is fetched as the pre-fetched data, and the peripheral data is requested by the peripheral device, and the addresses of the pre-fetched data and the addresses of the peripheral data are sequential; and
    a north bridge electrically connected to the CPU and the south bridge, the north bridge comprising:
        an address queue module for storing addresses of the pre-fetched data; and
        a snooping module for snooping a cache in the CPU according to the addresses of the pre-fetched data in the address queue to determine whether the pre-fetched data is updated and to ensure data coherence between the register and the cache.

2. The chip set of claim 1, wherein the pre-fetched data in the register is deleted while the pre-fetched data is updated by the CPU.

3. The chip set of claim 2, wherein while the pre-fetched data is updated, the north bridge transfers the updated pre-fetched data to the register.

4. The chip set of claim 1, wherein the snooping module periodically snoops the cache in the CPU according to the addresses in the address queue for checking whether the pre-fetched data in the register is updated by the CPU.

5. The chip set of claim 1, wherein the snooping module snoops the cache in the CPU according to the addresses in the address queue while writing data from the cache to a memory via the north bridge.

6. A computer system comprising:
    a central processing unit (CPU) comprising a cache for caching data;
    a memory for storing data where each data has a corresponding address;
    a peripheral device;
    a south bridge electrically connected to the peripheral device, the south bridge having a register for storing a plurality of pre-fetched read data to provide the pre-fetched read data to the peripheral device while being requested, wherein an adjoining data of a peripheral data is fetched as the pre-fetched data, and the peripheral data is requested by the peripheral device, and the addresses of the pre-fetched data and the addresses of the peripheral data are sequential; and
    a north bridge electrically connected to the CPU and the memory, the north bridge comprising:
        an address queue module for storing addresses of the pre-fetched data; and
        a snooping module for snooping a cache in the CPU according to the addresses of the pre-fetched data in the address queue to determine whether the pre-fetched data is updated and to ensure data coherence between the register and the cache.

7. The computer system of claim 6, wherein the pre-fetched data in the register is deleted by the south bridge when the pre-fetched data is updated by the CPU.

8. The computer system of claim 7, while the pre-fetched data is updated, the north bridge transfers the updated pre-fetched data to the register.

9. The computer system of claim 6, wherein the snooping module periodically snoops the cache according to the addresses in the address queue for checking whether the pre-fetched data in the register is updated by the CPU.

10. The computer system of claim 6, wherein the snooping module snoops the cache according to the addresses in the address queue while writing data from the cache to a memory via the north bridge.

11. The computer system of claim 6 wherein the peripheral data are obtained from the memory.

12. A method for cohering a plurality of pre-fetched data, the method comprising:
    storing pre-fetched data in a south bridge while transmitting peripheral data to a peripheral device, the addresses of the pre-fetched data and the addresses of the peripheral data being sequential;
    storing addresses of the pre-fetched data in a north bridge; and
    snooping a cache in a CPU to determine whether the pre-fetched data is updated and to ensure data coherence between the south bridge and the cache.

13. The method of claim 12 further comprising:
    deleting the pre-fetched data in the south bridge while the pre-fetched data is updated.

14. The method of claim 13 further comprising:
    transmitting the updated pre-fetched data to the south bridge.

15. The method of claim 12 comprising snooping the cache according to the addresses of the pre-fetched data in the north bridge.

* * * * *